United States Patent [19]

Sütterlin et al.

[11] Patent Number: 4,828,572
[45] Date of Patent: May 9, 1989

[54] PROCESS FOR DYEING OR PRINTING TEXTILE FIBRE MATERIALS IN STABLE BLACK SHADES USING METAL COMPLEX REACTIVE DYES WITH A RED SHIFT AND A YELLOW OR GREEN SHIFT

[75] Inventors: Wolfgang Sütterlin, Lörrach-Haagen, Fed. Rep. of Germany; Rainer Begrich, Rheinfelden, Switzerland

[73] Assignee: Ciba-Geigy Corporation, Ardsley, N.Y.

[21] Appl. No.: 107,900

[22] Filed: Oct. 13, 1987

Related U.S. Application Data

[63] Continuation of Ser. No. 884,256, Jul. 10, 1986, abandoned.

[30] Foreign Application Priority Data

Jul. 19, 1985 [CH] Switzerland ............... 3143/85
Aug. 23, 1985 [CH] Switzerland ............... 3641/85

[51] Int. Cl.⁴ ..................... C09B 67/22; D06P 1/38
[52] U.S. Cl. ............................. 8/549; 8/531; 8/532; 8/543; 8/641; 8/681; 8/682; 8/685; 8/917; 8/918; 8/924; 8/926
[58] Field of Search ................. 8/549, 641, 685

[56] References Cited

U.S. PATENT DOCUMENTS

| | | | |
|---|---|---|---|
| T 969,001 | 4/1978 | Davis et al. | 8/638 |
| 3,085,849 | 4/1963 | Dussy et al. | 8/543 |
| 3,354,140 | 11/1967 | Benz et al. | 8/682 |
| 4,289,496 | 9/1981 | Lister | 8/477 |
| 4,338,093 | 7/1982 | Hildebrand et al. | 8/549 |
| 4,504,272 | 3/1985 | Ong | 8/543 |

FOREIGN PATENT DOCUMENTS

| | | |
|---|---|---|
| 1353723 | 1/1964 | France . |
| 201316 | 7/1983 | German Democratic Rep. . |
| 123773 | 1/1984 | Poland . |
| 390868 | 8/1965 | Switzerland . |
| 985481 | 3/1965 | United Kingdom . |

OTHER PUBLICATIONS

United States Defensive Publication T969,001, Apr. 4, 1978.

*Primary Examiner*—A. Lionel Clingman
*Attorney, Agent, or Firm*—Edward McC. Roberts

[57] ABSTRACT

The invention relates to a process for dyeing or printing textile fibre materials in stable shades with reactive dyes which produce grey or black dyeings or prints, which process comprises dyeing or printing textile fibre materials with a mixture of heavy metal-containing, water-soluble reactive dyes which produce grey or black dyeings or prints, each component of which mixture, under identical dyeing, printing and fixation conditions, produces dyeings or prints with a tinge different from the tinge of the dyeings or prints produced by the other component, and carrying out subsequent fixation.

13 Claims, No Drawings

PROCESS FOR DYEING OR PRINTING TEXTILE FIBRE MATERIALS IN STABLE BLACK SHADES USING METAL COMPLEX REACTIVE DYES WITH A RED SHIFT AND A YELLOW OR GREEN SHIFT

This application is a continuation of application Ser. No. 884,256, filed July 10, 1986, abandoned.

The present invention relates to a novel process for dyeing or printing textile fibre materials in stable shades with reactive dyes which produce grey or black dyeings or prints, with subsequent fixation.

Textile fibre materials which are dyed or printed with a reactive dye which produces grey or black dyeings or prints often have unstable shades, i.e. one and the same dye produces dyeings or prints in grey or black shades with a reddish tinge or with a yellowish or greenish tinge. The fact that faulty shades are produced is for example mainly attributable to the fibre material and the pretreatment thereof and to the dyeing conditions, the printing recipe and the drying and fixation conditions. Factors which have an influence are e.g.

(a) with regard to the printing recipe: the nature of the thickener, the amount of alkali, the amount of oxidising agent;

(b) with regard to drying: temperature, time;

(c) with regard to steam fixation: the state and quality of the steam, such as temperature, moisture, freedom from air, content of reducing agents and steaming time;

(d) with regard to thermofixation: the amount of urea, temperature, time.

This problem of faulty dyeing or printing is especially critical in the case of medium to light shades in the grey range and in the case of fashion shades requiring a shading component from the grey range.

It is the object of the present invention to provide a process for dyeing or printing textile fibre materials in stable shades with reactive dyes which produce grey or black dyeings or prints, which process does not have the drawbacks described above and which meets present-day requirements.

This object is accomplished by applying, instead of one reactive dye which produces grey or black dyeings or prints, a mixture of two reactive dyes which produce grey or black dyeings or prints, which dyes, under identical conditions, counteract each other as regards the tinge of the dyeings or prints which they produce, i.e. the one dye produces dyeings or prints in grey or black shades with a reddish tinge and, under identical conditions, the other dye produces dyeings or prints in grey or black shades with a yellowish or greenish tinge.

Accordingly, the present invention relates to a process for dyeing or printing textile fibre materials in stable shades with reactive dyes which produce grey or black dyeings or prints, which process comprises dyeing or printing textile fibre material with a mixture of heavy metal-containing, water-soluble reactive dyes which produce grey or black dyeings or prints, each component of which mixture, under identical dyeing, printing and fixation conditions, produces dyeings or prints with a tinge different from the tinge of the dyeings or prints produced by the other component, and carrying out subsequent fixation.

Surprisingly, dyeings and prints which have stable shades are obtained by the process of this invention.

Suitable water-soluble reactive dyes are preferbly 1:2-metal complex dyes which contain as ligands monoazo or disazo dyes and as metal ion preferably a chromium or cobalt ion.

The amounts in which the defined dye mixture is employed in dye baths or printing pastes may vary within wide limits depending on the desired colour strength. In general, amounts of 0.01 to 10% by weight, based on the dye bath or printing paste, are advantageous.

A preferred embodiment of the process of this invention comprises using as heavy metal-containing reactive dyes fibre-reactive 1:2-chromium complex azo dyes or 1:2-cobalt complex azo dyes or a mixture thereof, in particular those azo dyes containing one or more water-solubilising groups.

Suitable water-solubilising groups in the heavy metal-containing dyes are: sulfone, sulfonamide, N-monoalkylsulfonamide, N,N-dialkylsulfonamide and, in particular, sulfonic acid groups.

Suitable sulfone groups are alkylsulfone groups, in particular $C_1$–$C_4$alkylsulfone groups.

Suitable N-monoalkylsulfonamide or N,N-dialkylsulfonamide groups are in particular those containing one or two $C_1$–$C_4$alkyl groups.

In the process of this invention it is preferred to use fibre-reactive heavy metal-containing reactive dyes which contain one to six water-solubilising groups, most preferably two to four water-solubilising groups.

The sulfo group-containing dyes employed in the process of this invention are present either in the form of their free sulfonic acid or, preferably, as salts thereof.

Suitable salts are for example the alkali metal, alkaline earth metal or ammonium salts or the salts of an organic amine. Examplesof such salts are the sodium, lithium, potassium or ammonium salts or the salt of triethanolamine.

A particularly preferred embodiment of the process of this invention comprises using a mixture of the 1:2-chromium complex dye and the 1:2-cobalt complex dye of an azo compound which is able to complex and the 1:2-chromium complex dye and the 1:2-cobalt complex dye of another azo compound, the one of which 1:2-chromium/1:2-cobalt complex dyes produces dyeings or prints in grey or black shades with a reddish tinge and the other of which 1:2-chromium/1:2-cobalt complex dyes produces dyeings or prints in grey or black shades with a yellowish or greenish tinge. Thus in accordance with the definition, each of the two components of the mixture comprises a unitary 1:2:chromium complex dye and a unitary 1:2-cobalt complex dye with identical ligands.

Another particularly preferred embodiment of the process of this invention comprises using a mixture of the 1:2-chromium complex dye of an azo compound which is able to complex and the 1:2-cobalt complex dye of another azo compound which is able to complex, which 1:2-chromium complex dye produces dyeings or prints in grey or black shades with a greenish tinge, and which 1:2-cobalt complex dye produces dyeings or prints in grey or black shade with a reddish tinge. Thus in accordance with the defintion, one component of the mixture comprises a unitary 1:2-chromium complex dye and the other component comprises a unitary 1:2-cobalt complex dye, the ligands of the 1:2-chromium complex and the 1:2-cobalt complex being different from each other in structure.

A more particularly preferred embodiment of the process of this invention comprises using as the one component of the mixture the 1:2-chromium/1:2-cobalt complex of the azo dye of the formula

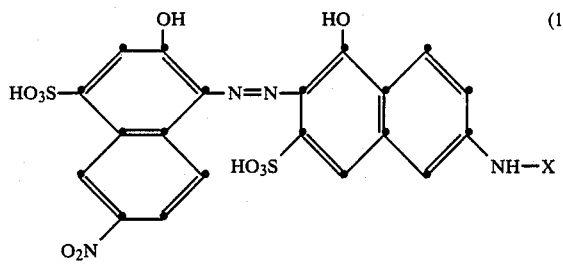

and as the other component the 1:2-chromium/1:2-cobalt complex of the azo dye of the formula

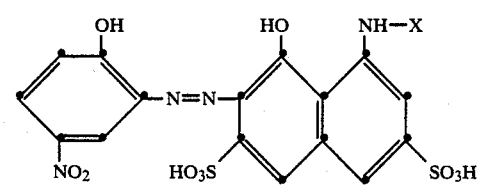

in which formulae (1) and (2) each X is a fibre-reactive radical which may be identical to or different from the other.

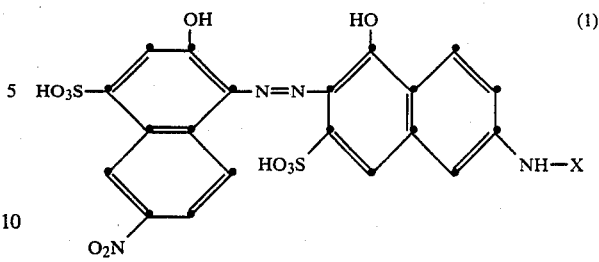

in which formulae (1) and (2) each X is a fibre-reactive radical which may be identical to or different from the other.

The azo dyes of formulae (1) and (2) preferably contain identical radicals X.

It is preferred to employ azo dyes of the formulae (1) and (2), wherein the radicals X are identical and are each a 2,5,6-trichloropyrimidin-4-yl radical or a 2-chloro-4-(amino, morpholino, β-sulfoethylamino, p-sulfophenylamino, o-sulfophenylamino, N-ethyl, N-phenylamino or 2'-(β-chloroethylsulfonylethoxyethylamino))-1,3,5-triazin-6-yl radical. A particularly preferred meaning of X is 2-chloro-4-amino-1,3,5-triazin-6-yl.

Accordingly, the most preferred embodiment of the process of this invention comprises using as the one component of the mixture the 1:2-chromium/1:2-cobalt complex of the azo dye of the formula

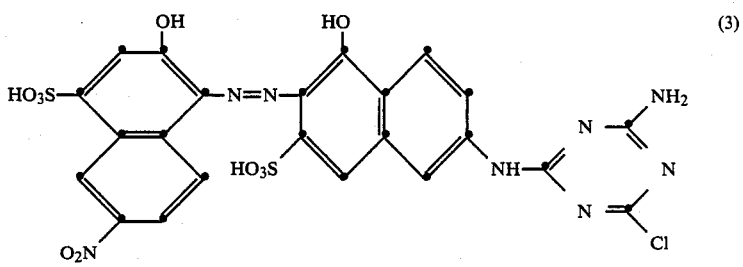

In the metal complexes of the azo dyes of formulae (1) and (2), the weight ratio of 1:2-chromium complex to 1:2-cobalt complex is in particular in the range from 80:20 to 60:40.

The weight ratio of the metal complexes of formula (1) to the metal complexes of formula (2) is preferably in the range from 80:20 to 20:80, in particular from 60:40 to 40:60, and is most preferably 50:50.

Another more particularly preferred embodiment of the process of this invention comprises using as the one component of the mixture the 1:2-chromium complex of the azo dye of the formula

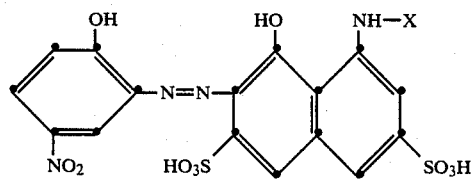

and as the other component the 1:2-cobalt complex of the azo dye of the formula and as the other component the 1:2-chromium/1:2-cobalt complex of the azo dye of the formula

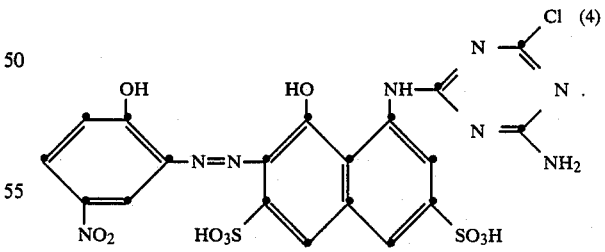

In the metal complexes of the azo dyes of formulae (3) and (4), the weight ratio of 1:2-chromium complex to 1:2-cobalt complex is in particular in the range from 80:20 to 60:40.

The weight ratio of the metal complexes of formula (3) to the metal complexes of formula (4) is preferably in the range from 80:20 to 20:80, in particular from 60:40 to 40:60, and is most preferably 50:50.

The alternative most preferred embodiment of the process of this invention comprises using as the one component of the mixture the 1:2-chromium complex of the azo dye of the formula

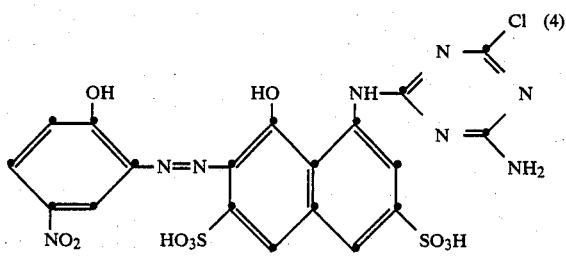

and as the other component the 1:2-cobalt complex of the azo dye of the formula

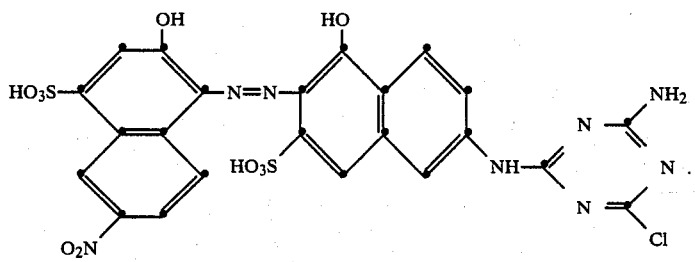

(3)

In this mixture, the weight ratio of 1:2-chromium complex to 1:2-cobalt complex is in the range from 95:5 to 50:50, in particular from 90:10 to 75:25.

The sulfo group-containing 1:2-metal complex dyes employed in the process of this invention are known per se and are obtained by known methods.

The dye mixtures employed in the process of this invention can be prepared e.g. by mixing the individual dyes. This mixing process is carried out for example in suitable mills, e.g. ball mills or pinned disc mills, as well as in kneaders or mixers.

Furthermore, the mixtures of dyes can be prepared by drying the aqueous dye solutions, with spray drying being preferred.

The dye baths and printing pastes may contain, in addition to the dye and the auxiliaries indicated, further conventional adjuvants.

Special apparatus is not required for carrying out the process of this invention. Conventional printing and dyeing equipment and machines can be used.

Further preferred embodiments of the process of this invention comprise (a) printing textile fibre materials with the mixture indicated above, (b) dyeing or printing textile fibre materials with dye mixtures containing the mixture indicated above and further dyes or dye mixtures; dyeing or printing in particular textile fibre materials made of blends with dye mixtures containing at least one disperse dye, a polyester/cellulose blend being preferred;

(c) dyeing or printing cellulose fibres.

Suitable textile materials are natural and synthetic fibres and mixtures thereof. Representative examples are: cotton, linen, viscose, polynosics, copper rayon fibres, wool, silk, synthetic polyamide, fibres, wool/polyamide, wool/polyester, wool/cellulose, wool/acrylic and polyester/cellulose blends.

It is preferred to use textile materials made of synthetic polyamide fibres, cellulose fibres and polyester/cellulose blends.

The textile materials are dyed or printed by methods known per se and subsequently fixed.

The dye is fixed on the fibre in accordance with conventional processes, with the fixation time and fixation temperature depending on the fibre material and the reactivity of the reactive dyes employed. In order to achieve uniform and optimum dye fixation, steaming times from 30 seconds to 12 minutes, in particular from 2 to 10 minutes, in the temperature range from 90° to 140° C., in particular from 100° to 105° C., are sufficient when using saturated steam. Fixation by high temperature steaming or dry heating is effected over a period lasting from 20 seconds to 8 minutes in the temperature range from 105° to 220° C.

In particular, the fixation of the dyeings or prints in the process of this invention is carried out in the presence of water vapour or hot air, under normal pressure and at a temperature in the range from 90° to 220° C.

In order to finish the dyeings or prints, they are rinsed in hot and/or cold water and, if necessary, subsequently washed in the presence of a commercially available detergent, then rinsed in water and dried.

Together with the defined mixture of heavy metal-containing, water-soluble reactive dyes which produce grey or black dyeings or prints, dyes which are only sparingly soluble in water (disperse dyes) or other water-soluble dyes may be applied.

Suitable disperse dyes are e.g. those known from the Colour Index as disperse dyes.

Suitable water-soluble dyes which contain e.g. one or more sulfonic acid groups as water-solubilising group and which may be applied together with the defined mixture of heavy metal-containing, water-soluble reactive dyes which produce grey or black dyeings or prints are non-reactive or fibre-reactive dyes, for example those listed in the Colour Index as acid, direct and reactive dyes.

The invention further relates to the dye mixture which contains heavy metal-containing, water-soluble reactive dyes which produce grey or black dyeings or prints, each component of which mixture, under identical dyeing, printing and fixation condition, produces dyeings or prints with a tinge different from the tinge of the dyeings or prints produced by the other component.

Preferred are dye mixtures which contain as heavy metal-containing reactive dyes fibre-reactive 1:2-chromium complex azo dyes or 1:2-cobalt complex azo dyes or a mixture thereof, in particular those azo dyes which contain one or more water-solubilising groups.

A particularly preferred dye mixture contains a mixture of the 1:2-chromium complex dye and the 1:2-cobalt complex dye of an azo compound which is able to complex and the 1:2-chromium complex dye and the 1:2-cobalt complex dye of another azo compound, the one of which 1:2-chromium/1:2-cobalt complex dyes produces dyeings or prints in grey or black shades with a reddish tinge and the other of which 1:2-chromium/1:2-cobalt complex dyes produces dyeings or prints in grey or black shades with a yellowish or greenish tinge.

Another particularly preferred dye mixture contains a mixture of the 1:2-chromium complex dye of an azo compound which is able to complex and the 1:2-cobalt complex dye of another azo compound which is able to complex, which 1:2-chromium complex dye produces dyeings or prints in grey or black shades with a greenish tinge, and which 1:2-cobalt complex dye produces dyeings or prints in grey or black shades with a reddish tinge.

A more particularly preferred dye mixture is that containing the 1:2-chromium/1:2-cobalt complex of the azo dye of formula (1) and the 1:2-chromium/1:2-cobalt complex of the azo dye of formula (2).

In the metal complexes of the azo dyes of formulae (1) and (2), the weight ratio of 1:2-chromium complex to 1:2-cobalt complex is in particulr in the range from 80:20 to 60:40.

The ratio of the metal complexes of formula (1) to the metal complexes of formula (2) is preferably in the range from 80:20 to 20:80, in particular from 60:40 to 40:60, and is most preferably 50:50.

Another more particularly preferred dye mixture is that containing the 1:2-chromium complex of the azo dye of formula (2) and the 1:2-cobalt complex of the azo dye of formula (1).

Preferably, the radicals X in formulae (1) and (2) are identical and are each a 2,5,6-trichloropyrimidin-4-yl radical or a 2-chloro-4-(amino, morpholino, β-sulfoethylamino, p-sulfophenylamino, o-sulfophenylamino, N-ethyl, N-phenylamino or 2'-(β-chloroethylsulfonylethoxyethylamino)-1,3,5-triazin-6-yl radical. A particularly preferred meaning of X is 2-chloro-4-amino-1,3,5-triazin-6-yl.

The most preferred dye mixture is therefore that containing the 1:2-chromium/1:2-cobalt complex of the azo dye of the formula

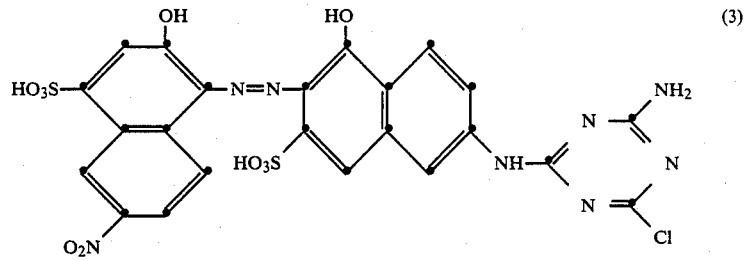

and the 1:2-chromium/1:2-cobalt complex of the azo dye of the formula

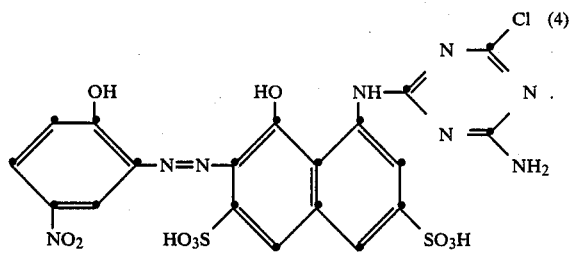

In the metal complexes of the azo dyes of formulae (3) and (4), the weight ratio of 1:2-chromium complex to 1:2-cobalt complex is in particular in the range from 80:20 to 60:40.

The ratio of the metal complexes of formula (3) to the metal complexes of formula (4) is preferably in the range from 80°to 20:80, in particular from 60:40 to 40:60, and is most preferably 50:50.

The alternative most preferred dye mixture is that containing the 1:2-chromium complex of the azo dye of the formula

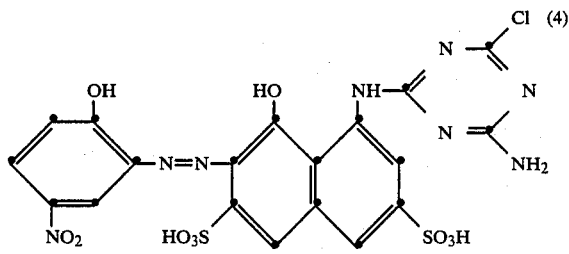

and the 1:2-cobalt complex of the azo dye of the formula

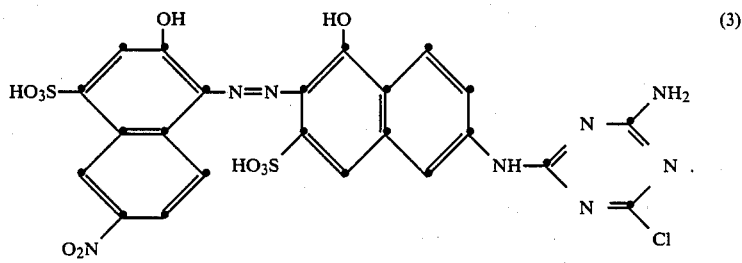

In this dye mixture the weight ratio of 1:2-chromium complex to 1:2-cobalt complex of the metal complexes is preferably in the range from 95:5 to 50:50, in particular from 90:10 to 75:25.

The dye mixture of this invention may be used for dyeing or printing textile fibre materials. Suitable textile fibre materials are those mentioned above. It is preferred to dye or print cellulose fibres with the dye mixtures of this invention. When using said dye mixtures, conventional dyeing, printing and fixation processes may be applied.

The use of the dye mixtures of this invention as components in mixtures with other dyes, e.g. to obtain opaque shades, is also interesting.

Suitable heavy metal-containing, water-soluble reactive dyes which produce grey or black dyeings or prints are in particular 1:2-chromium complex monoazo or disazo dyes and 1:2-cobalt complex monoazo or disazo dyes, the metallisable group, e.g. the —O— or —COO— group, of each of which dyes is vicinal to the azo group and contains one or more fibre-reactive radicals X.

By fibre-reactive radicals X are meant those radicals which are able to react with the hydroxyl groups of cellulose, the amino, carboxyl, hydroxyl and thiol groups of wool and silk, or with the amino and, if present, carboxyl groups of synthetic polyamides to form covalent chemical bonds.

Preferably, X is a fibre-reactive radical of the aliphatic, aromatic or heterocyclic series, which radical is attached to the chromophoric group direct or through a bridge member.

The fibre-reactive radical X is preferably attached to the chromophoric group direct or through an unsubstituted or monoalkylated amino group such as —NH—, —N(CH$_3$)—, —N(C$_3$H$_5$)— or —N(C$_3$H$_7$)— or through a bridge member which contains an amino group.

Suitable fibre-reactive radicals X are for example the following aliphatic and aromatic radicals:

vinylsulfonyl, β-chloroethylsulfonyl, β-sulfatoethylsulfonyl, acetoxyethylsulfonyl, phosphonooxyethylsulfonyl, β-thiosulfatoethylsulfonyl, N-methyl-N-(β-sulfatoethylsulfonyl)amino, acryloyl, monochloroacryloyl, dichloroacryloyl or trichloroacryloyl such as —CO—CCl=CH$_2$, —CO—CH=CH—Cl, —CO—CCl=CH—CH$_3$; monobromoacryloyl, dibromoacryloyl or tribromoacryloyl such as —CO—CBr=CH$_2$, —CO—CH=CH—Br, —CO—CBr=CH—CH$_3$; as well as —CO—CCl=CH—COOH, —CO—CH=CCl-13 COOH, —CO—CBr=CH—COOH, —CO—CH=CBr—COOH; —CO—CCl=CCl—COOH, —CO—CBr=CBr—COOH; precursors of the acryloyl radical and of derivatives of the acryloyl radical such as β-chloropropionyl, β-bromopropionyl, 3-phenylsulfonylpropionyl, 3-methylsulfonylpropionyl, 3-chloro-3-phenylsulfonylpropionyl, 2,3-dichloropropionyl, 2,3-dibromopropionyl; as well as 2-fluoro-2-chloro-3,3-difluorocyclobutane-1-carbonyl, 2,2,3,3-tetrafluorocyclobutane-1-carbonyl or -1-sulfonyl, β-(2,2,3,3-tetrafluorocyclobut-1-yl)acryloyl, α- or β-alkenylsulfonylacryloyl or -arylsulfonylacryloyl groups, such as α- or β-methylsulfonylacryloyl, propiolyl, chloroacetyl, bromoacetyl, 4-(β-chloroethylsulfonyl)butyryl, 4-vinylsulfonylbutyryl, 5-(β-chloroethylsulfonyl)valeryl, 5-vinylsulfonylvaleryl, 6-(β-chloroethylsulfonyl)caproyl, 6-vinylsulfonylcaproyl; as well as 4-fluoro-3-nitrobenzoyl, 4-fluoro-3-nitrophenylsulfonyl, 4-fluoro-3-methylsulfonylbenzoyl, 4-fluoro-3-cyanobenzoyl, and 2-fluoro-5-methylsulfonylbenzoyl.

Further examples of fibre-reactive radicals X belong to the heterocyclic series, such as 2,4-dichlorotriazin-6-yl, monohalopyrimidinyl, dihalopyrimidinyl or trihalopyrimidinyl radicals, such as 2,4-dichloropyrimidin-6-yl, 2,4,5-trichloropyrimidin-6-yl, 2,4-dichloro-5-nitro- or -5-methyl- or -5-carboxymethyl- or -5-carboxy- or -5-cyano- or -5-vinyl- or -5-sulfo- or -5-monochloromethyl-, -dichloromethyl- or -trichloromethyl- or -5-methylsulfonyl-6-pyrimidinyl, 2,5-dichloro-4-methylsulfonyl-6-pyrimidinyl, 2-fluoro-4-pyrimidinyl, 2,6-difluoro-4-pyrimidinyl, 2,6-difluoro-5-chloro-4-pyrimidinyl, 2-fluoro-5,6-dichloro-4-pyrimidinyl, 2,6-difluoro-5-methyl-4-pyrimidinyl, 2,5-difluoro-6-methyl-4-pyrimidinyl, 2-fluoro-5-methyl-6-chloro-4-pyrimidinyl, 2-fluoro-5-nitro-6-chloro-4-pyrimidinyl, 5-bromo-2-fluoro-4-pyrimidinyl, 2-fluoro-5-cyano-4-pyrimidinyl, 2-fluoro-5-methyl-4-pyrimidinyl, 2,5,6-trifluoro-4-pyrimidinyl, 5-chloro-6-chloromethyl-2-fluoro-4-pyrimidinyl, 2,6-difluoro-5-bromo-4-pyrimidinyl, 2-fluoro-5-bromo-6-chloromethyl-4-pyrimidinyl, 2,6-difluoro-5-chloromethyl-4-pyrimidinyl, 2,6-difluoro-5-nitro-4-pyrimidinyl, 2-fluoro-6-methyl-4-pyrimidinyl, 2-fluoro-5-chloro-6-methyl-4-pyrimidinyl, 2-fluoro-5-chloro-4-pyrimidinyl, 2-fluoro-6-chloro-4-pyrimidinyl, 6-trifluoromethyl-5-chloro-2-fluoro-4-pyrimidinyl, 6-trifluoromethyl-2-fluoro-4-pyrimidinyl, 6-trifluoromethyl-2-fluoro-4-pyrimidinyl, 2-fluoro-5-nitro-4-pyrimidinyl, 2-fluoro-5-trifluoromethyl-4-pyrimidinyl, 2-fluoro-5-phenyl or 5-methylsulfonyl-4-pyrimidinyl, 2-fluoro-5-carbamoyl-4-pyrimidinyl, 2-fluoro-5-carbomethoxy-4-pyrimidinyl, 2-fluoro-5-bromo-6-trifluoromethyl-4-pyrimidinyl, 2-fluoro-6-carbamoyl-4-pyrimidinyl, 2-fluoro-6-carbomethoxy-4-pyrimidinyl, 2-fluoro-6-phenyl-4-pyrimidinyl, 2-fluoro-6-cyano-4-pyrimidinyl, 2,6-difluoro-5-methylsulfonyl-4-pyrimidinyl, 2-fluoro-5-sulfonamido-4-pyrimidinyl, 2-fluoro-5-chloro-6-carbomethoxy-4-pyrimidinyl, 2,6-difluoro-5-trifluoromethyl-4-pyrimidinyl; 2,4-bismethylsulfonylpyrimidin-4-yl, 2,5-bismethylsulfonyl-5-chloropyrimidin-4-yl, 2-methylsulfonylpyrimidin-4-yl, 2-phenylsulfonylpyrimidin-4-yl, 2-methylsulfonyl-5-chloro-6-methylpyrimidin-4-yl, 2-methylsulfonyl-5-bromo-6-methylpyrimidin-4-yl, 2-methylsulfonyl-5-chloro-6-ethylpyrimidin-4-yl, 2-methylsulfonyl-5-chloromethylpyrimidin-4-yl, 2-methylsulfonyl-5-nitro-6-methylpyrimidin-4-yl, 2,5,6-trismethylsulfonylpyrimidin-4-yl, 2-methylsulfonyl-5,6-dimethylpyrimidin-4-yl, 2-ethylsulfonyl-5-chloro-6-methylpyrimidin-4-yl, 2-methylsulfonyl-6-chloropyrimidin-4-yl, 2,6-bismethylsulfonyl-5-chloropyrimidin-4-yl, 2-methylsulfonyl-6-carboxypyrimidin-4-yl, 2-methylsulfonyl-5-sulfopyrimidin-4-yl, 2-methylsulfonyl-6-carbomethoxypyrimidin-4-yl, 2-methylsulfonyl-5-carboxypyrimidin-4-yl, 2-methylsulfonyl-5-cyano-6-methoxypyrimidin-4-yl, 2-methylsulfonyl-5-chloropyrimidin-4-yl, 2-sulfoethylsulfonyl-6-methylpyrimidin-4-yl, 2-methylsulfonyl-5-bromopyrimidin-4-yl, 2-phenylsulfonyl-5-chloropyrimidin-4-yl, 2-carboxymethylsulfonyl-5-chloro-6-methylpyrimidin-4-yl, 2,4-dichloropyrimidine-6-carbonyl or -6-sulfonyl, 2,4-dichloropyrimidine-5-carbonyl or -5-sulfonyl, 2-chloro-4-methylpyrimidine-5-carbonyl, 2-methyl-4-chloropyrimidine-5-carbonyl, 2-methylthio-4-fluoropyrimidine-5-carbonyl, 6-methyl-2,4-dichloropyrimidine-5-carbonyl, 2,4,6-trichloropyrimidine-5-carbonyl, 2,4-dichloropyrimidine-5-sulfonyl, 2,4-dichloro-6-methylpyrimidine-5-carbonyl or -5-sulfonyl, 2-methylsulfonyl-6-chloropyrimidine-4- and -5-carbonyl, 2,6-bis(methylsulfonyl)pyrimidine-4- or -5-carbonyl, 2-ethylsulfonyl-6-chloropyrimidine-5-carbonyl, 2,4-bis(methylsulfonyl)pyrimidine-5-sulfonyl, 2-methylsulfonyl-4-chloro-6-methylpyrimidine-5-sulfonyl or -5-carbonyl, 2-chloroquinoxaline-3-carbonyl, 2- or 3-monochloroquinoxaline-6-carbonyl, 2- or 3-monochloroquinoxaline-6-sulfonyl, 2,3-dichloroquinoxaline-5- or -6-carbonyl, 2,3-dichloroquinoxaline-5- or -6-sulfonyl, 1,4-dichlorophthalazine-6-sulfonyl- or -6-carbonyl, 2,4-dichloroquinazoline-7- or -6-sulfonyl or -carbonyl, 2,4,6-trichloroquinazoline-7- or -8-sulfonyl, 2- or 3- or 4-(4',5'-dichloropyridazon-6'-yl-1')phenylsulfonyl or -carbonyl, β-(4',5'-dichloropyridazinon-6'-yl-1')propionyl, 3,6-dichloropyridazine-4-carbonyl or -4-sulfonyl, 2-chlorobenzothiazole-5- or -6-carbonyl or -5- or -6-sulfonyl, 2-arylsulfonyl- or -alkylsulfonylbenzothiazole-5- or -6-carbonyl or -5- or -6-sulfonyl, such as 2-methylsulfonylbenzothiazole- or 2-ethylsulfonylbenzothiazole-5- or -6-sulfonyl or -carbonyl, 2-phenylsulfonylbenzothiazole-5- or -6-sulfonyl or -carbonyl and the corresponding 2-sulfonylbenzothiazole-5- or -6-carbonyl or -sulfonyl derivatives which contain sulfo groups in the fused benzene ring, 2-chlorobenzoxazole-5- or -6-carbonyl or -sulfonyl, 2-chlorobenzimidazole-5-or -6-carbonyl or -sulfonyl, 2-chloro-1-methylbenzimidazole-5- or -6-carbonyl or -sulfonyl, 2-chloro-4-methylthiazole-(1,3)-5-carbonyl or -4- or -5-sulfonyl; ammonium-containing triazine rings, such as 2-trimethylammonium-4-phenylaminotriazin-6-yl- or -4-(o-, m- or p-sulfophenyl)aminotriazin-6-yl, 2-(1,1-dimethylhydrazinium)-4-phenylaminotriazin-6-yl, 2-(1,1-dimethylhydrazinium)-4-(o-, m- or p-sulfophenyl)aminotriazin-6-yl, 2-(2-isopropylidene-1,1-dimethyl)hydrazinium-4-phenylaminotriazin-6-yl, 2-(2-isopropylidene-1,1-dimethyl)hydrazinium-4-(o-, m- or p-sulfophenyl)aminotriazin-6-yl, 2-N-aminopyrrolidinium- or 2-N-aminopiperidinium-4-phenylaminotriazin-6-yl or -4-(o-, m- or p-sulfophenyl)aminotriazin-6-yl, and also 4-phenylaminotriazin-6-yl and 4-(sulfophenylamino)triazin-6-yl radicals which contain 1,4-bisazabicyclo[2.2.2]octane or 1,2-bisazabicyclo[0.3.3]octane attached through a quaternary nitrogen bound in the 2-position, 2-pyridinium-4-phenylaminotriazin-6-yl or 2-pyridinium-4-(o-, m- or p-sulfophenyl)aminotriazin-6-yl as well as the corresponding 2-oniumtriazin-6-yl radicals which are substituted in the 4-position by alkylamino such as methylamino, ethylamino or β-hydroxyethylamino, alkoxy such as methoxy or ethoxy, or aryloxy such as phenoxy, or sulfophenoxy groups.

Particularly interesting fibre-reactive radicals are fluoro-1,3,5-triazine radicals of the formula

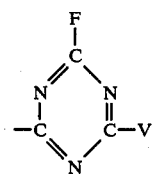

wherein the substituent V on the triazine ring may be in particular; —NH$_2$, alkylamino, N,N-dialkylamino, cycloalkylamino, N,N-dicycloalkylamino, aralkylamino and arylamino groups, mixed substituted amino groups such as N-alkyl-N-cyclohexylamino and N-alkyl-N-arylamino groups, amino groups which contain heterocyclic radicals which may carry further fused carbocyclic rings, amino groups in which the amino nitrogen atom is part of an N-heterocyclic ring which may contain further heteroatoms, and hydrazino and semicarbazido. The above-mentioned alkyl radicals can be straight chain or branched and be of low molecular weight or higher molecular weight, with alkyl radicals of 1 to 6 carbon atoms being preferred; suitable cycloalkyl, aralkyl and aryl radicals are in particular cyclohexyl, benzyl, phenethyl, phenyl and naphthyl radicals: heterocyclic radicals are in particular furan, thiophene, pyrazole, pyridine, pyrimidine, quinoline, benzimidazole, benzothiazole and benzoxazole radicals; and amino groups in which the amino nitrogen atom is part of an N-heterocyclic ring are preferably radicals of 6-membered N-heterocyclic compounds which may contain nitrogen, oxygen or sulfur as further heteroatoms. The above-mentioned alkyl, cycloalkyl, aralkyl and aryl radicals, the heterocyclic radicals and the N-heterocyclic rings may be further substituted, for example by: halogen such as fluorine, chlorine and bromine; nitro, cyano, trifluoromethyl, sulfamoyl, carbamoyl, $C_{1-4}$alkyl, $C_{1-4}$alkoxy; acylamino groups such as acetylamino or benzoylamino; ureido, hydroxyl, carboxyl, sulfomethyl or sulfo. Examples of amino groups of this type are: —NH$_2$, methylamino, ethylamino, propylamino, isopropylamino, butylamino, hexylamino, β-methoxyethylamino, γ-methoxypropylamino, β-ethoxyethylamino, N,N-dimethylamino, N,N-diethylamino, β-chloroethylamino, β-cyanoethylamino, γ-cyanopropylamino, β-carboxyethylamino, sulfomethylamino, β-sulfoethylamino, β-hydroxyethylamino, N,N-di-β-hydroxyethylamino, γ-hydroxypropylamino, benzylamino, phenethylamino, cyclohexylamino, phenylamino, toluidino, xylidino, chloroanilino, anisidino, phenetidino, N-methyl-N-phenylamino, N-ethyl-N-phenylamino, N-β-hydroxyethyl-N-phenylamino, 2-, 3- or 4-sulfoanilino, 2,5-disulfoanilino, 4-sulfomethylanilino, N-sulfomethylanilino, 2-, 3- or 4-carboxyphenylamino, 2-carboxy-5-sulfophenylamino, 2-carboxy-4-sulfophenylamino, 4-sulfonaphth-1-ylamino, 3,6-disulfonaphth-1-ylamino, 3,6,8-trisulfonaphth-1-ylamino, 4,6,8-trisulfonaphth-1-ylamino, 1-sulfonaphth-2-ylamino, 1,5-disulfonaphth-2-ylamino, 6-sulfonaphth-2-ylamino, morpholino, piperidino, piperazino, hydrazino and semicarbazido.

Compared with known processes comprising the use of heavy metal-containing, water-soluble reactive dyes which produce grey or black dyeings or prints, the process of the present invention affords dyeings and prints in shades which are of a distinctly better stability.

The invention is illustrated in more detail by the following Examples, in which parts and percentages are by weight. The relationship between parts by weight and parts by volume is the same as that between the gram and the cubic centimeter.

EXAMPLE 1

A fabric made of mercerised cotton is pattern printed with a printing paste containing 0.5 g/kg of the 1:2-chromium/1:2-cobalt complex of the azo dye of the formula

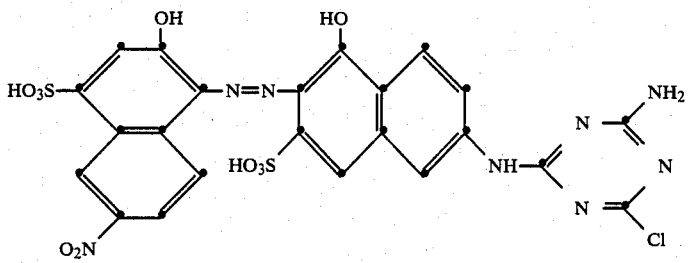

(3)

which consists of 67% by weight of the 1:2-chromium complex and 33% by weight of the 1:2-cobalt complex of the azo dye of formula (3), 0.5 g/kg of the 1:2-chromium/1:2-cobalt complex of the azo dye of the formula

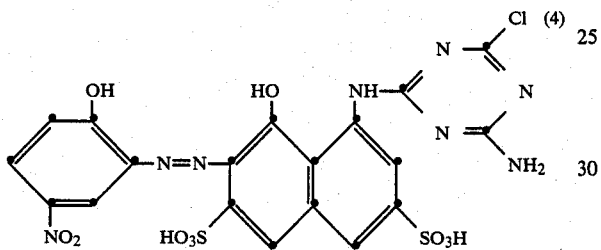

(4)

which consists of 75% by weight of the 1:2-chromium complex and 25% by weight of the 1:2-cobalt complex of the azo dye of formula (4),
- 120 g/kg of urea,
- 8 g/kg of sodium n-nitrobenzenesulfonate,
- 48 g/kg of a 25% solution of $Na_2CO_3$,
- 400 g/kg of sodium alginate thickener and
- 423 g/kg of soft water.

The printed fabric is then dried at 100° C. for 3 minutes, subsequently steamed for 8 minutes at 101°-102° C. in
 (a) a steamer of open construction (Mathis steamer)
 (b) a steamer of closed construction (star steamer)
and rinsed with cold water and then with boiling water until the non-fixed dye has been removed. The printed fabric is dried in the temperature range from 90° to 100° C. Light grey prints are obtained. The fabrics treated in the Mathis steamer have the same shade as those treated in the star steamer.

COMPARATIVE EXAMPLE 1

By carrying out the procedure indicated in Example 1, but using instead of the mixture of the metal complexes of formulae (3) and (4) 1 g/kg of the 1:2-chromium/1:2-cobalt complex of the azo dye of formula (3) indicated in Example 1, light grey prints are obtained. The fabric treated in the Mathis steamer has a reddish tinge and the fabric treated in the star steamer has a greenish tinge and the fabric treated in the star steamer has a greenish tinge.

COMPARATIVE EXAMPLE 2

By carrying out the procedure indicated in Example 1, but using instead of the mixture of the metal complexes of formulae (3) and (4) 1 g/kg of the 1:2-chromium/1:2-cobalt complex of the azo dye of formula (4), light grey prints are obtained. The fabric treated in the Mathis steamer has a greenish tinge and the fabric treated in the star steamer has a reddish tinge.

EXAMPLE 2

A fabric made of mercerised cotton is impregnated with a liquor of the following composition:
- 4.8 g/l of the 1:2-chromium/1:2-cobalt complex of the azo dye of formula (3) according to Example 1,
- 1.2 g/l of the 1:2-chromium/1:2-cobalt complex of the azo dye of formula (4) according to Example 1,
- 200 g/l of urea,
- 3 g/l of sodium m-nitrobenzenesulfonate,
- 20 g/l of calcinated $Na_2CO_3$ and
- 771 g/l of soft water.

The impregnated fabric is dried for 75 seconds at 120° C. and then fixed for 2 minutes at 160° C. The fabric is subsequently rinsed, soaped and dried in conventional manner. A grey uniform dyeing is obtained which is in the same shade as the dyeing obtaining by the following pad steam process:

A fabric made of mercerised cotton is padded with a solution containing:
- 4.8 g/l of the 1:2-chromium/1:2-chromium/1:2-cobalt complex of the azo dye of formula (3) according to Example 1,
- 1.2 g/l of the 1:2-chromium/1:2-cobalt complex of the azo dye of formula (4) according to Example 1 and
- 3 g/l of sodium m-nitrobenzenesulfonate.

The fabric is dried at 120° C. for 75 seconds and impregnated with a liquor containing
- 250 g/l of NaCl and
- 40 g/l of a 30% solution of NaOH.

The liquid pick-up of the fabric is about 70%. Subsequently, without intermediate drying, steaming is effected at 102° C. for 90 seconds.

If instead of the mixture of the metal complexes the individual metal complexes are used as in Comparative Examples 1 and 2, then dyeings in different faulty shades are obtained, i.e. greenish or reddish grey dyeings.

EXAMPLE 3

A fabric made of mercerised cotton is pattern printed with a printing paste containing
- 0.15 g/kg of the 1:2-cobalt complex of the azo dye of the formula

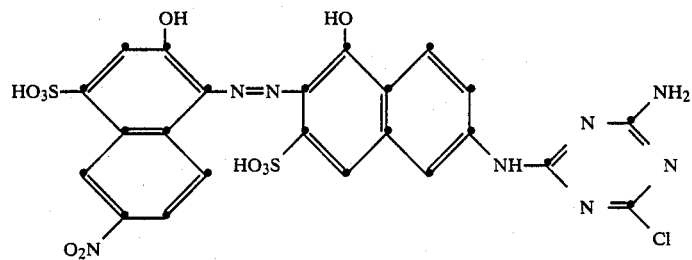
(3)

0.85 g/kg of the 1:2-chromium complex of the azo dye of the formula

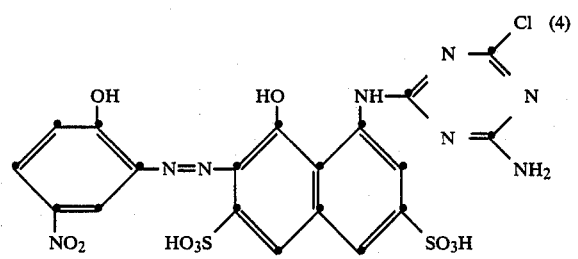
(4)

120 g/kg of urea,
8 g/kg of sodium m-nitrobenzenesulfonate,
48 g/kg of a 25% solution of $Na_2CO_3$,
400 g/kg of sodium alginate thickener and
423 g/kg of soft water.

The printed fabric is then dried at 100° C. for 3 minutes, subsequently steamed for 8 minutes at 101°–102° C.
(a) in a Mathis steamer
(b) in a star steamer and rinsed with cold water and then with boiling water until the non-fixed dye has been removed. The printed fabric is dried in the temperature range from 90° to 100° C. Light grey prints are obtained. The fabrics treated in the Mathis steamer have the same shade as those treated in the star steamer.

By carrying out the procedure indicated in any one of Examples 1 to 3, but using instead of the metal complexes of the azo dyes of formulae (3) and (4) an equimolar amount of the corresponding metal complexes of the azo dyes of the formulae

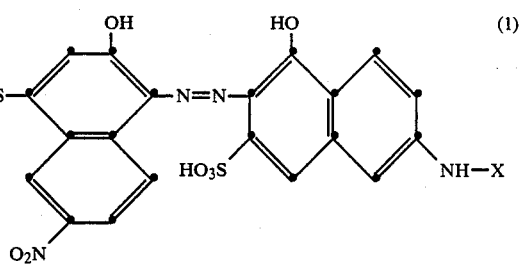
(1)

and

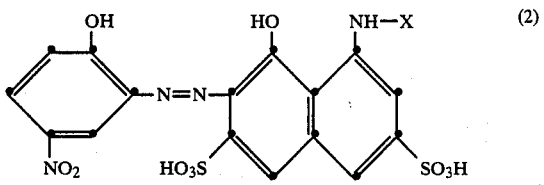
(2)

in which formulae the radicals X are identical and are each as indicated in the following Table, then grey dyeings or prints in identical shades are likewise obtained:

TABLE

| Example | X | Example | X |
|---|---|---|---|
| 4 | ![Cl,Cl-triazine with Cl] | 5 | ![triazine-morpholine with Cl] |
| 6 | ![triazine-NHCH2CH2SO3H with Cl] | 7 | ![triazine-NH-C6H4-SO3H with Cl] |

TABLE-continued

| Example | X | Example | X |
|---|---|---|---|
| 8 | 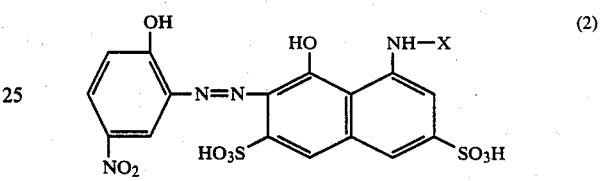 | 9 | |
| 10 | 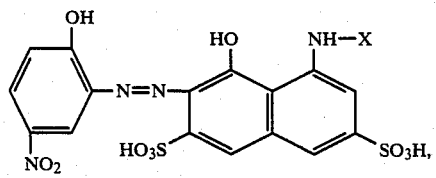 | | |

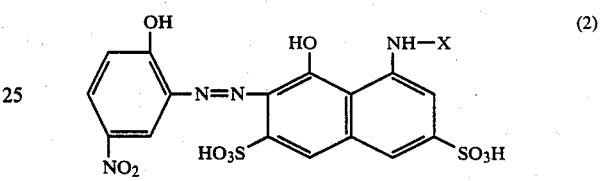

What is claimed is:

1. A process for dyeing or printing textile fiber materials in stable shades with reactive dyes which produce grey or black dyeings or prints, which comprises dyeing or printing to stable shade textile fiber materials with mixtures of (A) the 1:2 chromium complex and the 1:2 cobalt complex of an azo dye of the formula

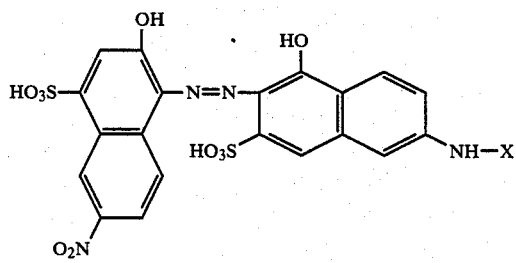 (1)

and the 1:2 chromium complex and the 1:2 cobalt complex of an azo dye of the formula

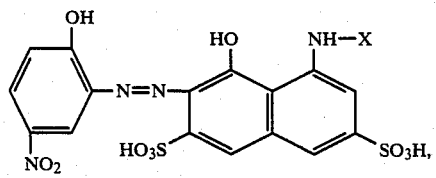 (2)

wherein X in each of formula (1) and (2) is an identical or different aliphatic, aromatic or heterocyclic fiber reactive radical, the one of the 1:2 chromium/1:2 cobalt complex dyes produces dyeings or prints in grey or black shades with a reddish tinge and the other of which 1:2 chromium/1:2 cobalt complex dyes produces dyeings or prints in grey or black shades with a yellowish or greenish tinge; or (B) the 1:2 chromium complex of an azo dye of formula

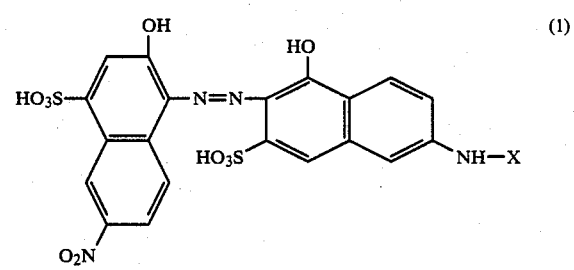 (2)

and the 1:2 cobalt complex of an azo dye of formula

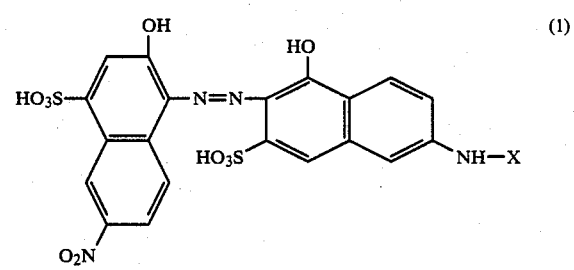 (1)

wherein X in each of formulas (1) and (2) is an identical or different aliphatic, aromatic or heterocyclic fiber reactive radical, which 1:2 chromium complex dye produces dyeings or prints in grey or black shades with a greenish tinge and which 1:2 cobalt complex dye produces dyeings or prints in grey or black shades with a reddish tinge.

2. A process according to claim 1, which comprises using as the one component of the mixture the 1:3-chromium/1:2-cobalt complex of the azo dye of the formula

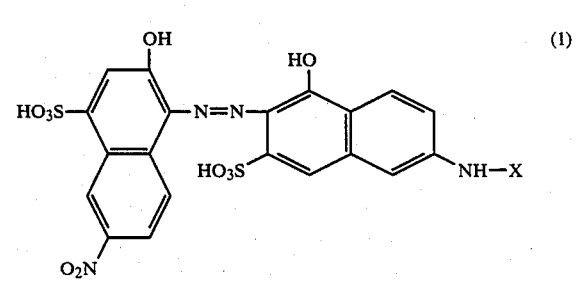 (1)

and as the other component the 1:2-chromium/1:2-cobalt complex of the azo dye of the formula chromium/1:2-cobalt complex of the azo dye of the formula

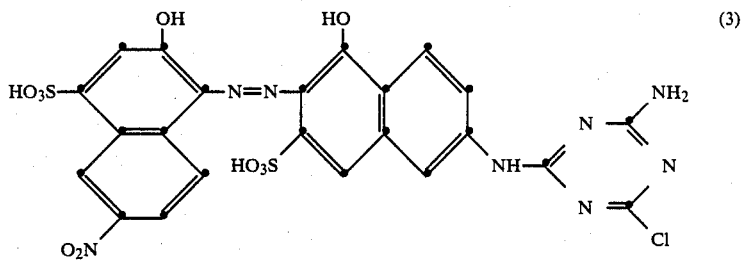

(3)

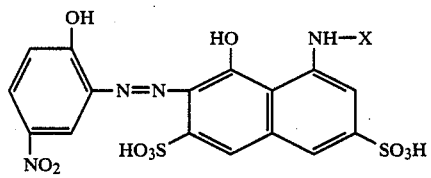

(2)

wherein X in each of formulas (1) and (2) is an identical or different aliphatic, aromatic or heterocyclic fiber reactive radical.

3. A process according to claim 1, which comprises using as the one component of the mixture the 1:2-chromium complex of the azo dye of the formula

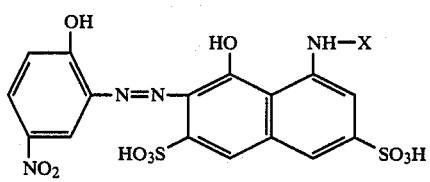

(2)

and as the other component the 1:2-cobalt complex of the azo dye of the formula

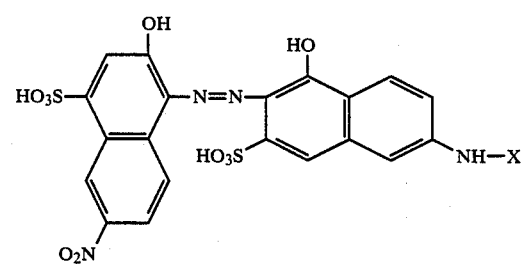

(1)

wherein X in each of formulas (1) or (2) is an identical or different aliphatic, aromatic or heterocyclic fiber reactive radical.

4. A process according to claim 2, which comprises using as the one component of the mixture the 1:2- and as the other component the 1:2-chromium/1:2-cobalt complex of the azo dye of the formula

(4)

5. A process according to claim 3, which comprises using as the one component of the mixture the 1:2-chromium complex of the azo dye of the formula

(4)

and as the other component the 1:2-cobalt complex of the azo dye of the formula

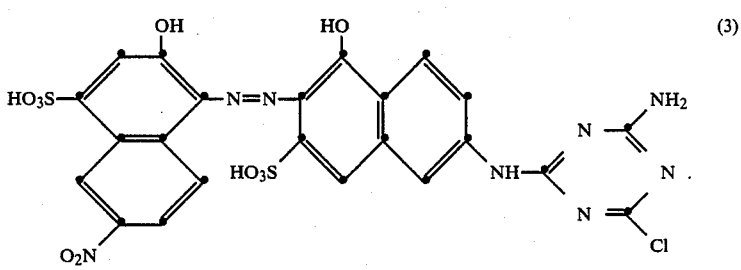

(3)

6. A process according to claim 1, which comprises printing textile fibre materials with the mixture indicated in claim 1.

7. A process according to claim 1, which comprises dyeing or printing textile fibre materials with a dye mixture containing the mixture indicated in claim 1 and further dyes or dye mixtures.

8. A process according to claim 1, which comprises carrying out the fixation in the presence of water vapour or hot air, under normal pressure and at a temperature in the range from 90° to 220° C.

9. A dye mixture for dyeing or printing textile fiber material in stable shades, which mixture comprises:

(A) the 1:2 chromium complex and the 1:2 cobalt complex of an azo dye of the formula

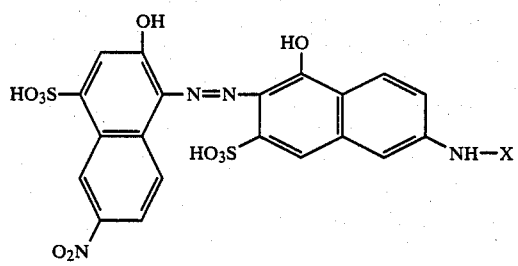

and the 1:2 chromium complex and the 1:2 cobalt complex of an azo dye of the formula

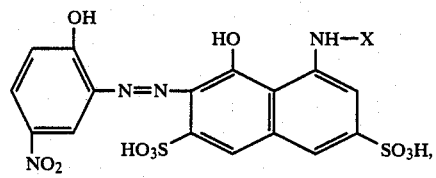

wherein X in each of formulas (1) and (2), is an identical or different aliphatic, aromatic or heterocyclic fiber reactive radical, the one of the 1:2 chromium/1:2 cobalt complex dyes produces dyeings or prints in grey or black shades with a reddish tinge and the other of which 1:2 chromium/1:2 cobalt complex dyes produces dyeings or prints in grey or black shades with a yellowish or greenish tinge; or (B) the 1:2 chromium complex of an azo dye of formula

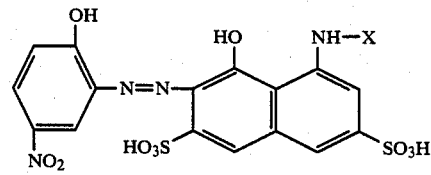

and the 1:2 cobalt complex of an azo dye of formula

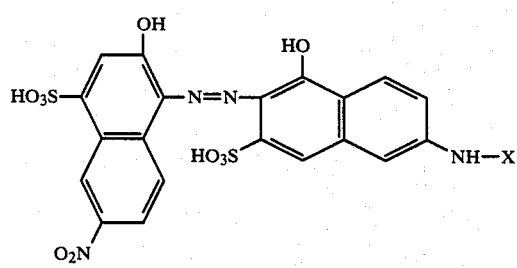

wherein X in each of formulas (1) and (2) is an identical or different aliphatic, aromatic or heterocyclic fiber reactive radical, which 1:2 chromium complex dye produces dyeings or prints in grey or black shades with a greenish tinge and which 1:2 cobalt complex dye produces dyeings or prints in grey or black shades with a reddish tinge.

10. A dye mixture according to claim 9, which contains the 1:2-chromium/1:2-cobalt chromium complex of the azo dye of the formula

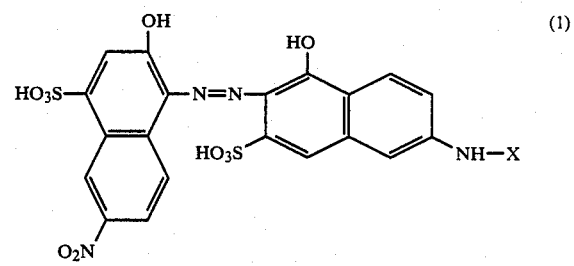

and the 1:2-chromium/1:2-cobalt complex of the azo dye of the formula

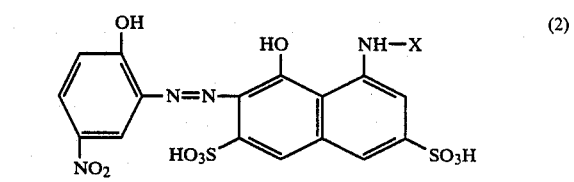

wherein X is in each of formulas (1) and (2) is an identical or different aliphatic, aromatic or heterocyclic fiber-reactive radical.

11. A dye mixture according to claim 9, which contains the 1:2-chromium complex of the azo dye of the formula

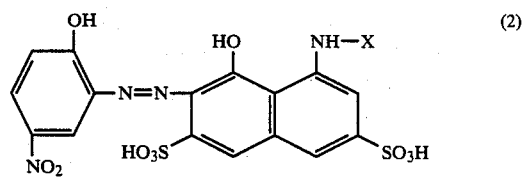

and the 1:2-cobalt complex of the azo dye of the formula

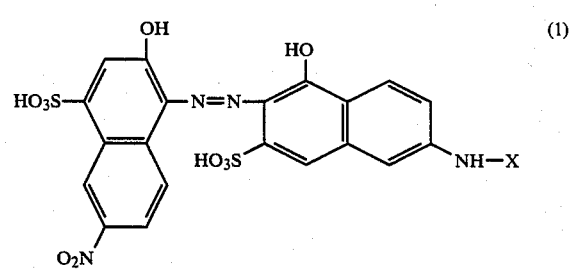

wherein X in each of formulas (1) and (2) is an identical or different aliphatic, aromatic or heterocyclic fiber-reactive radical.

12. A dye mixture according to claim 10, which contains the 1:2-chromium/1:2-cobalt complex of the azo dye of the formula

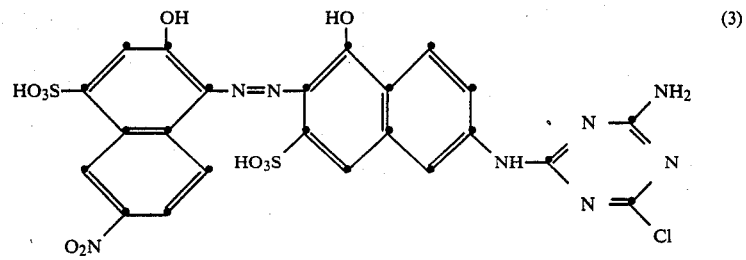
and the 1:2-chromium/1:2-cobalt complex of the azo dye of the formula
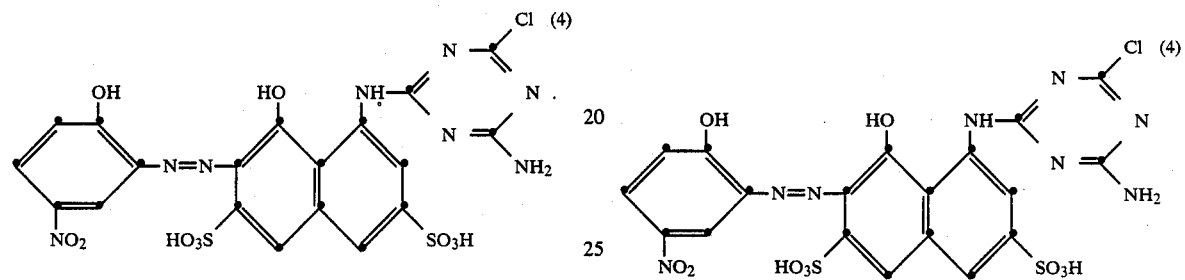
13. A dye mixture according to claim 11, which contains the 1:2-chromium complex of the azo dye of the formula
and the 1:2-cobalt complex of the azo dye of the formula
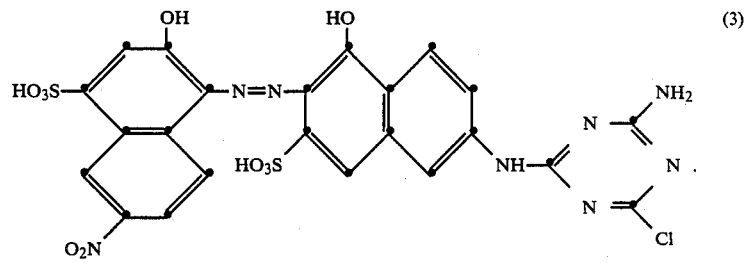
* * * * *